(12) United States Patent (10) Patent No.: US 8,581,462 B2
Nussbaumer (45) Date of Patent: Nov. 12, 2013

(54) BEARINGLESS ELECTRIC ROTARY DRIVE

(75) Inventor: Thomas Nussbaumer, Zurich (CH)

(73) Assignee: Levitronix GmbH, Zurich (CH)

( * ) Notice: Subject to any disclaimer, the term of this patent is extended or adjusted under 35 U.S.C. 154(b) by 415 days.

(21) Appl. No.: 12/832,886

(22) Filed: Jul. 8, 2010

(65) Prior Publication Data

US 2011/0025154 A1 Feb. 3, 2011

(30) Foreign Application Priority Data

Jul. 30, 2009 (EP) ..................................... 09166844

(51) Int. Cl.
*H02K 7/09* (2006.01)
(52) U.S. Cl.
CPC ........................ *H02K 7/09* (2013.01)
USPC .......................... 310/90.5; 310/90; 310/156.01
(58) Field of Classification Search
CPC ........................................................ H02K 7/09
USPC ........................................... 310/90, 90.5, 156
IPC ...................................................... H02K 7/09
See application file for complete search history.

(56) References Cited

U.S. PATENT DOCUMENTS

| | | | |
|---|---|---|---|
| 5,729,066 A * | 3/1998 | Soong et al. ................. | 310/90.5 |
| 6,166,469 A * | 12/2000 | Osama et al. ................. | 310/90.5 |
| 6,362,549 B1 * | 3/2002 | Shi et al. ..................... | 310/90.5 |
| 6,794,780 B2 * | 9/2004 | Silber et al. ................... | 310/90.5 |
| 6,933,644 B2 * | 8/2005 | Kanebako .................... | 310/90.5 |
| 7,667,418 B2 * | 2/2010 | Kascak et al. ........... | 318/400.02 |
| 8,283,813 B2 * | 10/2012 | Gilchrist et al. ........... | 310/12.14 |
| 2003/0057784 A1 * | 3/2003 | Kanebako .................... | 310/90.5 |
| 2003/0164654 A1 * | 9/2003 | Thaxton et al. .............. | 310/90.5 |
| 2005/0035670 A1 | 2/2005 | Chen et al. | |
| 2005/0264121 A1 | 12/2005 | Yajima et al. | |
| 2008/0024026 A1 | 1/2008 | Aoyama et al. | |
| 2008/0231989 A1 | 9/2008 | Oki et al. | |
| 2008/0238230 A1 | 10/2008 | Mochida et al. | |
| 2009/0079284 A1 * | 3/2009 | Onuma et al. ................ | 310/90.5 |
| 2011/0025154 A1 * | 2/2011 | Nussbaumer ................ | 310/90.5 |

* cited by examiner

*Primary Examiner* — John K Kim
(74) *Attorney, Agent, or Firm* — Kilpatrick Townsend & Stockton LLP

(57) ABSTRACT

An electric rotary drive is proposed, designed as a bearingless external rotor motor, having a magnetically supported, substantially ring-shaped rotor (3) which is arranged around an inwardly disposed stator (2), wherein an air gap (4) is provided between the rotor (3) and the stator (2), wherein the stator (2) is designed as a bearing and drive stator with which the rotation of the rotor (3) can be driven about an axis of rotation (A) and with which the rotor (3) can be magnetically supported, wherein the rotor (3) is radially supported in an actively magnetic manner in the plane perpendicular to the axis of rotation (A) and is supported axially in the direction of the axis of rotation (A) and against tilting in a passively magnetic manner. The stator (2) has, at least in its marginal region (26), a magnetic height (H1) which is smaller than the magnetic rotor height (H2) of the rotor (3) in its radially inwardly disposed region (36).

17 Claims, 5 Drawing Sheets

BEARINGLESS ELECTRIC ROTARY DRIVE

CROSS REFERENCE TO RELATED APPLICATIONS

This application claims the priority of European Application No. 09 166 844.2, filed on Jul. 30, 2009, the disclosure of which is incorporated herein by reference.

The invention relates to an electric rotary drive, which is designed as a bearingless motor, in accordance with the preamble of the independent claim.

In a bearingless motor, the stator is designed as a bearing and drive stator for the magnetic support of the rotor and the drive of the rotation of the rotor about the axis of rotation. In this respect, the rotor is frequently made in disk form or in ring form.

Such a bearingless motor is disclosed, for example, in EP-A-0 860 046 and also in EP-A-0 819 330. The term bearingless motor means that the motor is supported completely magnetically, with no separate magnetic bearings being provided. For this purpose, the stator is made as a bearing and drive stator; it is therefore both the stator of the electric drive and the stator of the magnetic support. For this purpose, the winding of the stator includes a drive winding with the pole pair number p as well as a control winding with the pole pair number p±1. A rotating magnetic field can be produced using these two windings which, on the one hand, exerts a torque onto the rotor which effects its rotation and which, on the other hand, exerts a shear force, which can be set as desired, onto the rotor so that the rotor's radial position can be controlled or regulated actively. Three degrees of freedom of the rotor can thus be actively regulated. The rotor is passively magnetically, that is not controllably, stabilized by reluctance forces with respect to three further degrees of freedom, namely its axial deflection in the direction of the axis of rotation and tilts with respect to the plane perpendicular to the axis of rotation A (two degrees of freedom). Reference is made to the already cited documents with respect to further details of such a bearingless motor.

The bearingless motor can be designed as an internal rotor, that is with an inwardly disposed rotor and a stator arranged around it, or as an external rotor, that is with an inwardly disposed stator and a rotor arranged around it.

It has previously been assumed that in particular with a disk-shaped or ring-shaped rotor the properties of the magnetic support for the internal rotor are essentially the same as for the outer rotor, that is the rotor and the stator can be swapped over without this having any substantial influences on the magnetic support.

It has now been shown that this assumption only applies to the stiffness with respect to the axial bearing, that is for the passive magnetic axial bearing which stabilizes the rotor against displacements in the direction of the axis of rotation. The external rotor is, in contrast, much weaker than the internal rotor with respect to the stabilization of the rotor against tilting from the direction of the axis of rotation.

For a comparison, an external rotor with a ring-shaped rotor and an internal rotor with a disk-shaped rotor are considered, with the radius of the air gap between the rotor and the stator being the same for both rotary drives, in the specific case 55 mm; that is the spacing from the axis of rotation up to the air gap between the stator and the rotor is the same with the internal rotor and the external rotor, here namely 55 mm. It has been shown for a plurality of construction heights of the rotor that the axial stiffness and the capacity of the passive magnetic axial bearing are practically identical for the external rotor and the internal rotor with respect to displacements in the direction of the axis of rotation. In this respect, the construction height means the extent of the magnetically active parts of the rotor in the axial direction which is fixed by the axis of rotation.

The situation is different for the stabilization with respect to tilts of the rotor. The maximum construction height of the rotor with which a tilt stabilization can still just be effected with the external rotor amounts in these trials to approximately 40% of the radius of the air gap; the optimum construction height is at approximately 15% of the radius of the air gap. With the internal rotor, in contrast, a tilt stabilization can also be achieved if the construction height is as large as the radius of the air gap.

The maximum achievable tilt-stabilizing torque is also dramatically smaller with the external rotor and amounts to less than a third of the corresponding torque which can be achieved with the internal rotor.

This considerably reduced tilt stabilization of the external rotor is insufficient for many applications in practice.

It is therefore an object of the invention to provide a bearingless external rotor motor which has a better stabilization of the rotor against tilting with respect to the axis of rotation.

The subject of the invention satisfying this object is characterized by the features of the independent claim.

In accordance with the invention, an electric rotary drive is proposed, designed as a bearingless external rotor motor, having a magnetically supported rotor of substantially ring shape which is arranged around an inwardly disposed stator, wherein an air gap is provided between the rotor and the stator, wherein the stator is designed as a bearing and drive stator with which the rotation of the rotor about an axis of rotation can be driven and with which the rotor can be magnetically supported, wherein the rotor is radially supported in an actively magnetic manner in the plane perpendicular to the axis of rotation and is axially supported in the direction of the axis of rotation and against tilting in a passively magnetic manner. The stator has a magnetic height at least in its marginal region which is smaller than the magnetic rotor height of the rotor in its radially inwardly disposed region.

In this respect, the extent of the magnetically active parts of the stator in the axial direction fixed by the axis of rotation is meant by the magnetic height of the stator. Analogously, the extent of the magnetically active parts of the rotor in the axial direction is meant by the magnetic rotor height.

Since the stator has a smaller magnetic height in at least its marginal region than the region of the rotor facing it, the stabilization of the rotor with respect to tilting can be considerably improved. The magnetic field lines between the stator and the rotor are considerably longer due to the height difference with the external rotor in the tilted state than in the case of an equal magnetic height of the rotor and the stator in the marginal region. Since longer field lines mean a higher energy, the tilted state is considerably more unfavorable in the rotary drive in accordance with the invention than with the same magnetic height of the rotor and stator. An increased stabilization against tilting results from this.

Consequently, good stabilization against tilting can also be achieved for large rotor heights. The maximum tilt-stabilizing torque is considerably higher in the external rotor in accordance with the invention and can become so large as with an internal rotor with the same radius of the air gap.

A particularly good stabilization against tilting can be achieved if the minimal magnetic rotor height is at most so large as half the external diameter of the rotor, in particular at most so large as the radius of the air gap.

The feature in accordance with the invention that the stator has a magnetic height in at least its marginal region which is smaller than the magnetic rotor height of the rotor in its radially inwardly disposed region can be realized by a plurality of measures of which some preferred ones will be listed in the following.

The magnetic height of the stator can have a step so that the magnetic height of the stator in the marginal region is smaller than in a central region.

The magnetic height of the stator can reduce continuously outwardly in the marginal region.

The magnetic height of the stator can reduce linearly outwardly in the marginal region; for example, the stator can be made chamfered with respect to the radial direction in its marginal region.

The magnetic height of the stator can reduce in a curved manner, both concavely and convexly, in the marginal region. The curvature can in particular also be spherical.

The magnetically active part of the stator can be designed rounded in the marginal region so that the magnetic height reduces toward the outside. For this purpose, the marginal region of the stator can be designed outwardly arched as in a crown.

In the marginal region, the magnetically active part of the stator can have at least one peripheral groove which extends around the total stator in the peripheral direction. The magnetic height of the stator can also hereby be reduced in the marginal region.

A particularly simple embodiment is if the magnetic height of the stator is constant over the diameter of the stator.

In an analog manner, it is naturally also possible, alternatively or additionally, to change the magnetic rotor height of the rotor in at least its radially inwardly disposed region. The following preferred measures are, for example, possible for this purpose.

The magnetic rotor height of the rotor can have a step so that the magnetic rotor height in the inwardly disposed region is larger than in an outwardly disposed region.

The magnetic rotor height can increase inwardly in the inwardly disposed region, with straight-line increases and curved increases being possible.

The magnetic rotor height can increase continuously inwardly in the inwardly disposed region.

A particularly simple embodiment with respect to the rotor is also when the magnetic rotor height is constant over the diameter of the rotor.

Such embodiments are preferred with respect to the stator in which the stator has a plurality of stator teeth, in particular four.

A particularly important application for practice is when the rotor is designed as a permanent magnet rotor.

Further advantageous measures and embodiments of the invention result from the dependent claims.

The invention will be explained in more detail in the following with reference to embodiments and to the drawing. There are shown in the schematic drawing, partly in section:

FIG. 1: a schematic representation of an embodiment of an electric rotary drive in accordance with the invention;

FIG. 2 a schematic representation of the embodiment in accordance with a section along the line II-II in FIG. 1;

FIGS. 3-6: as FIG. 2, but for variants of the stator;

FIGS. 7-10: as FIG. 2, but for variants of the stator and

FIG. 11: a schematic representation of a second embodiment of an electric rotary drive in accordance with the invention.

FIG. 1 shows, in a schematic sectional representation, an embodiment of an electric rotary drive in accordance with the invention which is designated as a whole by the reference numeral 1. FIG. 2 shows a schematic representation of the embodiment which corresponds to a section along the line II-II in FIG. 1.

The electric rotary drive 1 in accordance with the invention is designed as an external rotor motor—in the following also external rotor—that is having an inwardly disposed stator 2 and having a rotor 3 which is arranged around the stator 2. The rotor 3 is designed in ring shape and is supported completely magnetically. An air gap 4 is present between the rotor 3 and the stator 2 (see also FIG. 2) which can hardly be recognized in FIG. 1.

The electromagnetic rotary drive 1 is designed as a bearingless motor, with the term bearingless motor having to be understood, as initially explained, namely that no separate magnetic bearings are present for the rotor 3. The stator 3 is both a bearing stator and a drive stator with which a torque can be generated which drives the rotation of the rotor 3 about an axis of rotation A and with which the rotor can be magnetically supported. For this purpose, the stator has a winding 21 (only shown in part in FIG. 1) which includes a drive winding with the pole pair number p as well as a control winding with the pole pair number p±1. The rotor 3 is actively magnetically supported in the plane perpendicular to the axis of rotation A with respect to its radial position, that is the radial position of the rotor 3 can be actively controlled or regulated via the winding 21 of the stator. The rotor is passively magnetically, that is not controllably, stabilized by reluctance forces with respect to three further degrees of freedom, namely its axial deflection in the direction of the axis of rotation A and tilts with respect to the plane perpendicular to the axis of rotation A (two degrees of freedom). Reference must be made here to EP-A-0 860 046 and EP A-0 819 330 with respect to further details of the bearingless motor.

The axis of rotation A of the rotor 3 is the desired axis of rotation about which the rotor 3 rotates when it is centered and not tilted with respect to the stator 2. In this case, both the rotor axis and the stator axis coincide with the axis of rotation A.

The stator 2 has a magnetic height H1 (see FIG. 2) and the rotor 3 has a magnetic height H2.

The extent of the magnetically active parts of the stator 2 or of the rotor 3 in the axial direction fixed by the axis of rotation A is respectively meant by the magnetic height H1 of the stator 2 or by the magnetic rotor height H2 of the rotor. In this respect, those parts of the stator 2 or of the rotor 3 whose magnetic properties provide the drive and the support of the rotor are meant by the magnetically active parts. They can, for example, be permanent magnets or iron or sheet iron plates or parts of sintered soft magnetic powder. In contrast, for example, jackets of the rotor made of plastic, ceramic material or non-magnetic metals, more precisely non-ferromagnetic metals, in particular steel, stainless steel or so-called non-magnetic steel, remain out of consideration for the magnetic rotor height H2.

In the following, reference is made with exemplary character to the application which is particularly important for practice and in which the rotor 3 is designed as a permanent magnetic rotor. It is understood that the invention is not restricted to permanent magnetic rotors. The rotor 3 can, for example, also be designed as a reluctance rotor, in a motor which works in accordance with the principle of the reluctance motor. The rotor 3 can also include a short-circuited winding or be designed as a cage rotor such as in induction motors.

FIG. 1 shows, in a schematic representation, a plan view of the embodiment of the electromagnetic rotary drive 1, whereas in FIG. 2 a schematic representation of the embodiment is shown which corresponds to a section along the line II-II in FIG. 1. The air gap 4 is show larger in FIG. 2 than in FIG. 1 for better understanding.

The ring-shaped rotor 3 includes a permanent magnetic ring 31 as well as a ring-shaped iron yoke 32 which is arranged concentrically thereto and which surrounds the permanent magnetic ring 31 at its outer side. The permanent magnetic ring 31 includes a plurality of permanent magnetic segments 311—12 here—which are magnetized alternately radially outwardly and radially inwardly, as is indicated by the arrows without reference numerals in the segments 311. It is understood that the rotor 3 can include further parts, for example a plastic jacket or a steel jacket, which are however, not essential to the understanding of the invention. They will therefore not be looked at in any more detail. The outer diameter of the ring-shaped rotor 3 is designated as the diameter DR of the rotor.

The inwardly disposed stator 2 has a plurality of stator teeth 22—four here—of which each is designed substantially in T shape or in anchor shape and extends radially outwardly out of the center through which the axis of rotation A extends. Each T-shaped stator tooth 22 includes a limb 221 which extends in the radial direction and a segment-shaped pole shoe 222 which extends substantially perpendicular to the limb 221 and whose outer side facing the rotor 3 is designed in circular segment shape. The outsides of all the pole shoes 222 are disposed on the same circle through whose center the axis of rotation A extends. The diameter of this circle is the diameter DS of the stator. The stator teeth 22 are produced, for example, from iron, in particular from a packet of iron metal sheets.

Such embodiments of the stator 2 are naturally also possible in which the stator teeth 22 do not have any pronounced pole shoes 222, but rather the respective radially outwardly disposed ends of the limbs 222 form poles.

Since the magnetically active air gap 4 between the pole shoes 222 and the rotor 3 is very narrow in practice, the half diameter DS of the stator 3 usually only differs slightly or negligibly from the radius of the air gap 4.

The winding 21 of the stator 2 is provided on the limbs 221 of the stator 2 as is shown for a limb 221 in FIG. 1.

Since all further components of the electric rotary drive 1, such as the control devices and regulation devices, are sufficiently known, they will not be looked at in any more detail here.

In accordance with the invention, the stator 2 has a magnetic height H1 at least in its marginal region which is smaller than the magnetic rotor height H2 of the rotor 3 in its radially inwardly disposed region. This feature is to be understood such that it includes the following possibilities: the magnetic height of the stator 2 is constant in its marginal region or the magnetic height of the stator 2 reduces constantly or continuously in its marginal region or the magnetic height of the stator 2 has at least one step in its marginal region or the magnetic height of the stator is regionally constant in its marginal region; for example, the magnetic height can first reduce outwardly—in a linear or curved manner—in the marginal region with respect to the radial direction and then remain constant. Analogously, the same applies to the magnetic rotor height in the radially inwardly disposed region of the rotor 3 which can be constant there or increasing radially inwardly or combinations thereof.

FIG. 2 shows a particularly simple and therefore also preferred embodiment. The magnetic height H1 of the stator 2 is constant over the diameter DS of the stator 2 and the magnetic rotor height H2 is constant over the rotor 3, with H2 being larger than H1.

The magnetic field lines between the rotor 3 and the stator 2 are longer in the event of tilts of the rotor 3 than with the same height H1 of the stator and H2 of the rotor due to these measures. However, longer field lines mean an energetically higher state so that the tilted state for H2>H1 is energetically higher than for H1=H2. However, this means that the non-tilted state is much more attractive in comparison with the tilted state when H2>H1. A better stabilization of the non-tilted state results from this when H2>H1.

It is not necessary in this respect that the relationship H2>H1 applies to the whole stator 2 or to the whole rotor 3. It has rather been shown that the condition H2>H1 only has to apply in the oppositely disposed marginal regions of rotor 3 and stator 2. This means that the magnetically effective air gap 4 between the stator 2 and the rotor 3 expands toward the axial margins or in the region of the axial margins. The axial margins in this respect mean the respective two ends of the rotor 3 or of the stator 2 in the axial direction, that is the upper or lower ends respectively in accordance with the illustration (FIG. 2 or FIGS. 3-10). FIG. 2 represents the borderline case that the air gap 4 can also include the total inner space of the rotor 3 in the axial marginal region.

There are a plurality of possibilities how the feature can be realized that the magnetic height H1 of the stator 2 is smaller at least in its marginal region than the magnetic rotor height H2 in the radially inwardly disposed region of the rotor 3.

In the following, some preferred variants of how the stator 2 or the rotor 2 can be designed will be explained with reference to FIGS. 3-10. The representations in FIGS. 3-10 correspond to the representation in FIG. 2. The same parts or parts which are equivalent in function are each designated by the same reference numerals in FIGS. 3-10.

FIG. 3 shows a variant in which the magnetic height of the stator 2 has a step which separates a central region 25 from a marginal region 26.

The central region 25 is the region which is disposed inwardly with respect to the radial direction and which is outwardly adjoined by the marginal region 26. In the central region 25, the stator 2 has a larger magnetic height than in the marginal region 26. In the central region 25, the magnetic height of the stator 2 is the same size as the magnetic rotor height H2, whereas in the marginal region 26 of the stator 2, its magnetic height H1 is smaller than the magnetic rotor height H2. The magnetic height in the central region of the stator can naturally also be different from the magnetic rotor height H2.

FIG. 4 shows a variant similar to the variant in FIG. 3, but a peripheral groove 27, which extends around the total stator 2, viewed in the peripheral direction, is additionally provided in the marginal region 26 of the magnetically active part of the stator 2. It is understood that more than one peripheral groove 27 can naturally also be provided. Two webs 28 are formed by this peripheral groove 27. The magnetic height H1 of the stator in the marginal region 26 then results as the sum of the height of the webs 28 in the axial direction.

A peripheral groove 27, or a plurality of peripheral grooves, can naturally also be provided in the variant in accordance with FIG. 2.

FIG. 5 shows a variant of the stator 2 in which the magnetic height in the marginal region 26 of the stator reduces continuously outwardly in the radial direction until it adopts the value H1 at the radially outer margin. In the central region 25, the stator 2 can constantly have the same magnetic height as the magnetic rotor height H2. The continuous reduction in the magnetic height in the marginal region 26 of the stator 2 is linear in this variant, that is, in the marginal region 26, the stator 2 is designed chamfered with respect to the radial direction. It is naturally also possible that the continuous reduction of the magnetic height is not linear, but rather curved, in the marginal region 26. Both concave and convex curvatures are possible for this purpose.

The variant in FIG. 6 shows a special case of a continuous, curved reduction of the magnetic height of the stator 2 in its marginal region 26. In this variant, the magnetically active part of the stator 2 is rounded in the form of a camber in its marginal region 26. The rounding is preferably spherical. The magnetic height of the stator 2 reduces continuously in the marginal region 26 here, viewed in the radial direction, until it finally reaches the value zero—at least theoretically—at the most extreme point with respect to the radial direction.

It is understood that the variants shown in FIGS. 2-6 can naturally also be combined with one another.

Variants are shown in FIGS. 7-10 which relate to modifications to the rotor 3. The stator 2 in each case has a constant magnetic height H1 over its total diameter DS in FIGS. 7-10. This does not have to be the case. The variants shown in FIGS. 7-10 can naturally also be combined with those which are shown for the stator 2 in FIGS. 2-6.

FIG. 7 shows a variant in which the magnetic rotor height of the rotor 3 has a step. The rotor has an inwardly disposed region 36 with respect to the radial direction which here includes the total permanent magnetic ring 31 and a region 35 which is outwardly disposed with respect to the axial direction and which here includes the total iron yoke 32. The magnetic height of the outwardly disposed region 35 is constant with respect to the radial direction and is equal to the magnetic height H1 of the stator 2, whereas the inwardly disposed region 36 has a constant magnetic height H2 in the radial direction which is larger than H1 so that a step occurs in the magnetic rotor height between the inwardly disposed region 36 and the outwardly disposed region 35.

Figure 10:
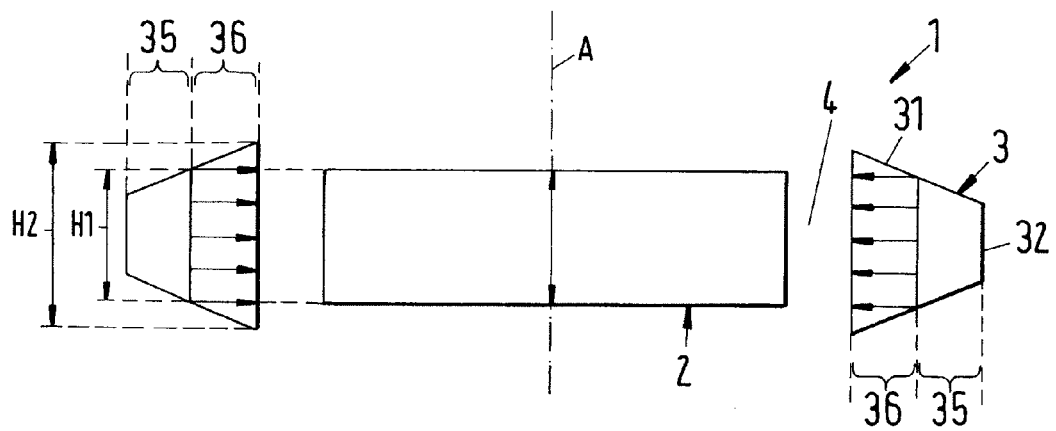

FIG. 10 shows a variant in which the magnetic rotor height in the inwardly disposed region 36 increases inwardly until it adopts the value H2 at the radially inwardly disposed boundary surface which is larger than the magnetic height H1 of the stator 2. Specifically, the magnetic rotor height increases continuously inwardly, in a linear manner here, in the inwardly disposed region 36. Embodiments are naturally also possible in which the continuous increase of the magnetic rotor height follows a curved-line function which can be concave or convex.

Figure 6:
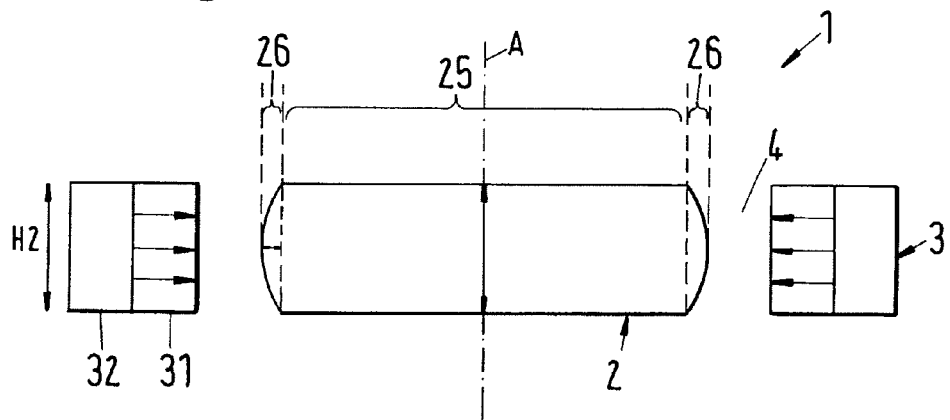
Figure 7:
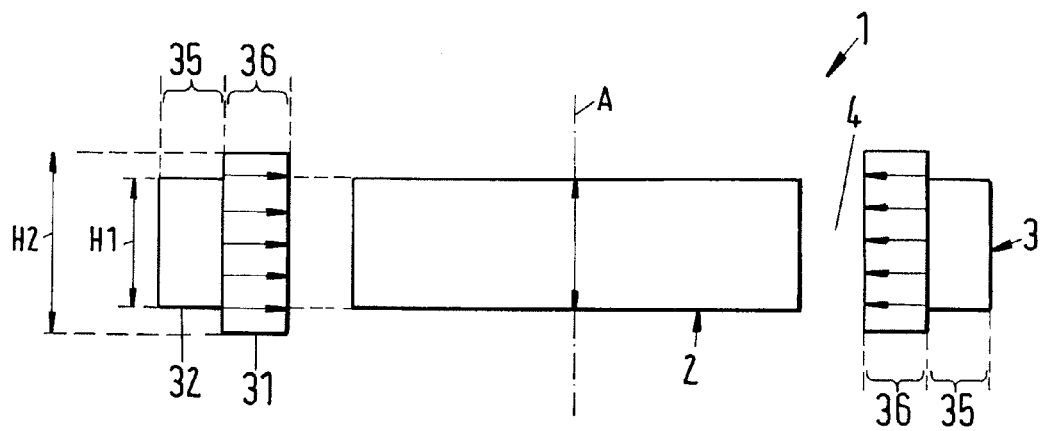

A plurality of variants are still possible to realize a rotary drive 1 in accordance with the invention. It is essential that the stator 2 has a magnetic height, at least in its outer marginal region 26 with respect to the radial direction, which is smaller than the magnetic rotor height of the rotor 3 in its radially inwardly disposed region 36, with it also being meant by "smaller" that the magnetic height in the marginal region of the stator 2 can decrease outwardly, i.e. reduces continuously, or that the magnetic rotor height in the inwardly disposed region 36 of the rotor 3 increases inwardly, e.g. increases continuously. The magnetic height of the sensor 2 in its marginal region 26 can in particular also reduce down to zero (see e.g. FIG. 6).

Figure 2:
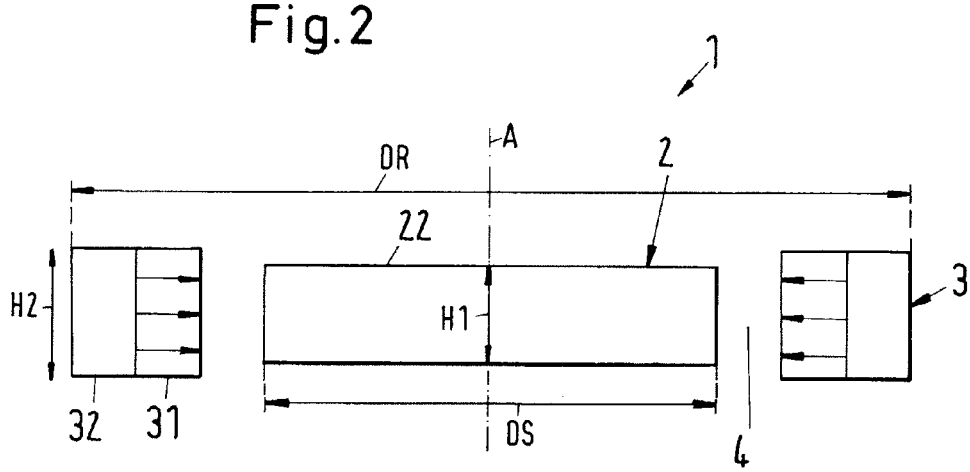
Figure 3:
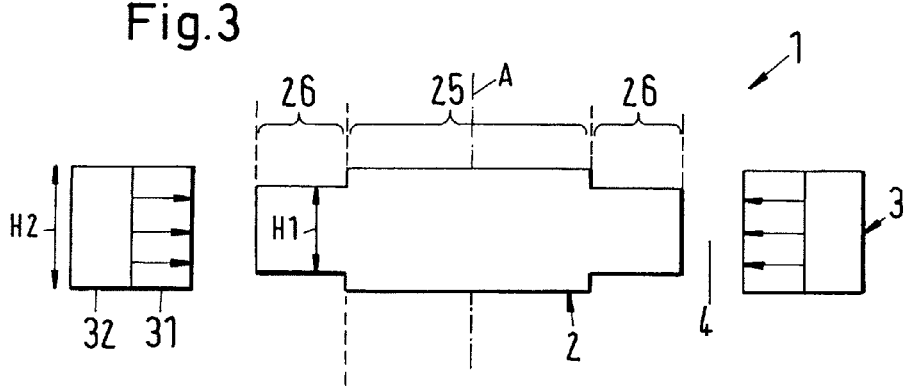
Figure 4:
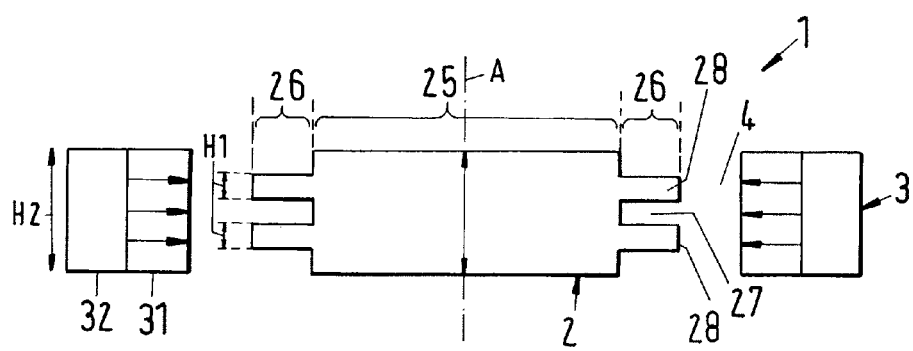
Figure 5:
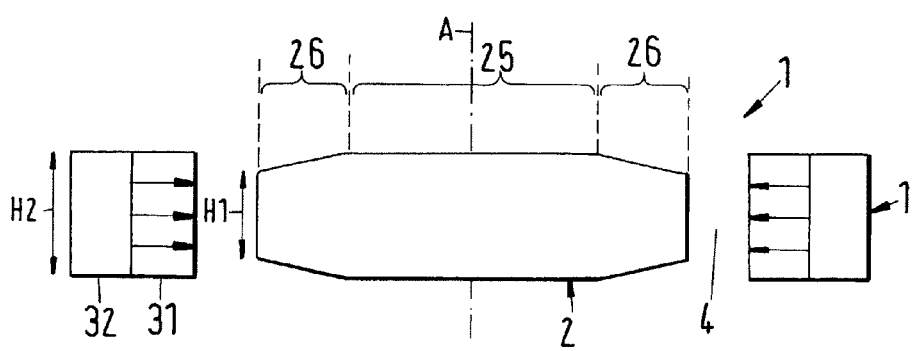

The magnetically active air gap 4 between the rotor 3 and the stator 2 expands by this measure toward the margins which bound the rotor 3 or the stator 2 in the axial direction. In the case of FIG. 2, the air gap 4 takes up the whole inner space 2 of the rotor 3 at the axial margins of the stator 2.

The magnetic field lines between the rotor 3 and the stator 2 are extended by these measures in the tilted state if they are compared with the field lines of the tilted state in an external rotor with the same constant magnetic height of the stator and magnetic rotor height. This extension of the field lines corresponds to an energetically higher state, whereby the non-tilted state is stabilized.

Figure 11:
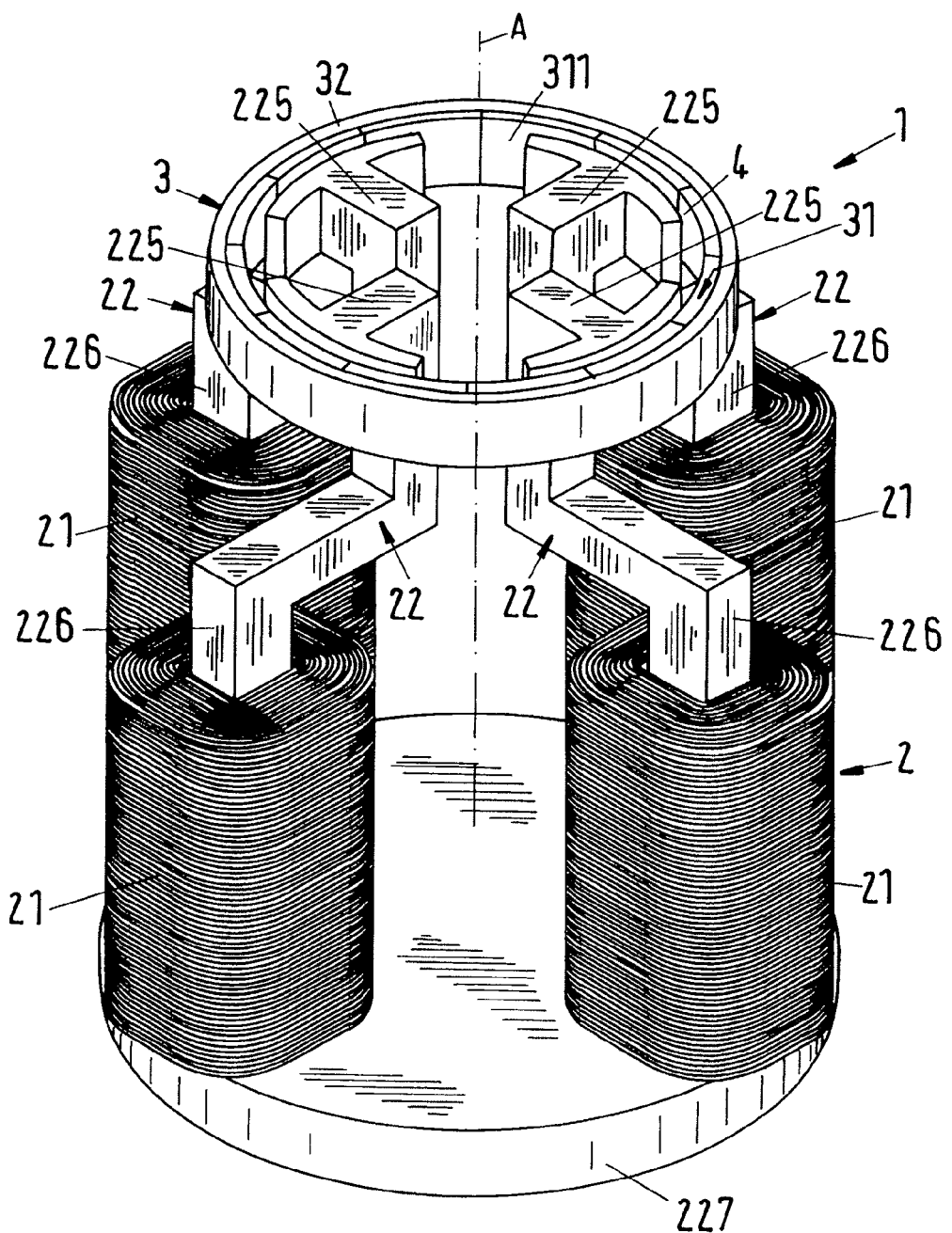

FIG. 11 shows a second embodiment of an electric rotary drive 1 in accordance with the invention in a perspective schematic representation. Parts which are the same or equivalent in function are designated by the same reference numerals as in the embodiment described in the above.

Figure 8:
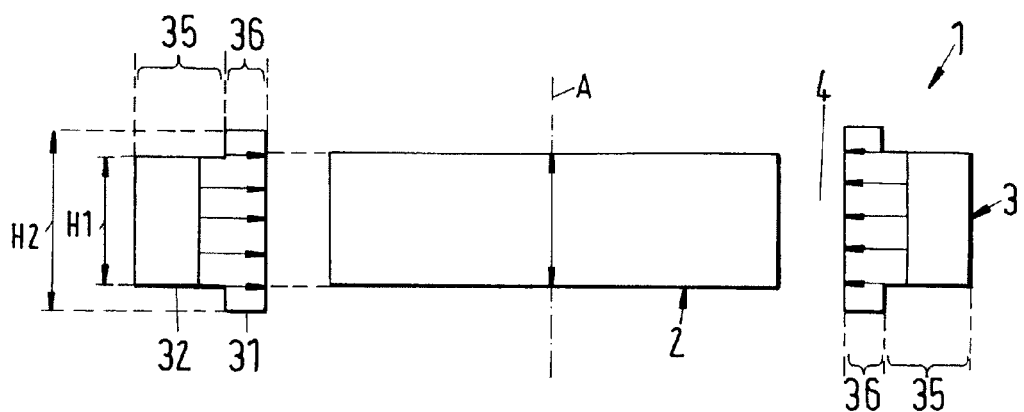
FIG. 8 shows a variant like FIG. 7, but the step is now provided in the region of the permanent magnetic ring 31. The step can naturally also be provided in the region of the iron yoke 32.
Figure 9:
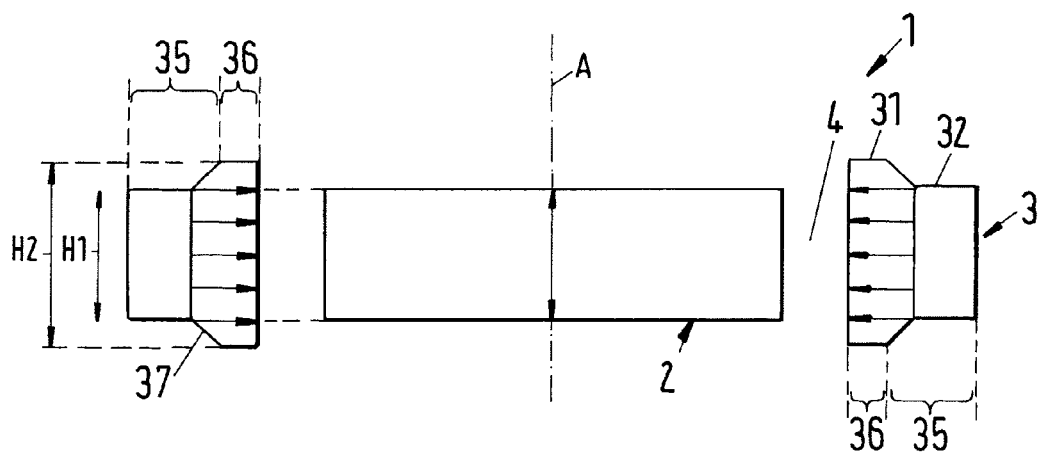
FIG. 9 shows a variant in which the step in the magnetic rotor height is replaced by a chamfer 37.

The external rotor motor shown in FIG. 11 is set up in accordance with the principle of the temple motor. The temple motor is disclosed, for example, in the already cited EP-A-0 860 046 (see FIG. 8k and associated text passages); however, as an internal rotor in the embodiment. In the temple motor, the stator 2 is designed such that each stator tooth 22 respectively includes a first limb 225 extending in the radial direction and a second limb 226 extending in the axial direction, with the winding 21 in each case being arranged on the second limbs 226 extending in the axial direction. The winding 21 of the stator 2 is therefore not arranged in the same plane as the rotor 3 as in the embodiment shown in FIG. 1, but rather beneath the rotor 3 in accordance with the illustration (FIG. 11). The winding 21 can naturally also be provided above the rotor 3.

In the simplest case, as is shown for the internal rotor in FIG. 8k of EP-A-0 860 046, the stator teeth are each designed in L shape, with the smaller limb of the L extending in the radial direction and the longer limb provided with the winding in the axial direction.

In the second embodiment of an external rotor shown in FIG. 11, each stator tooth 22 is designed with a threefold kink, mainly for space reasons. First, the first limb 225 extends radially inwardly to the axis of rotation A from the respective pole shoe 222, then the stator tooth 22 extends in the axial direction, downwardly in accordance with the illustration, subsequently outwardly in the radial direction and then the second limb 226 adjoins which extends in the axial direction, downwardly in accordance with the illustration. All the stator teeth 22 end on a plate-shaped yoke 227 which realizes the magnetic yoke of the stator teeth 22. The temple motor is identical in its function to the embodiment shown in FIG. 1.

Figure 1:
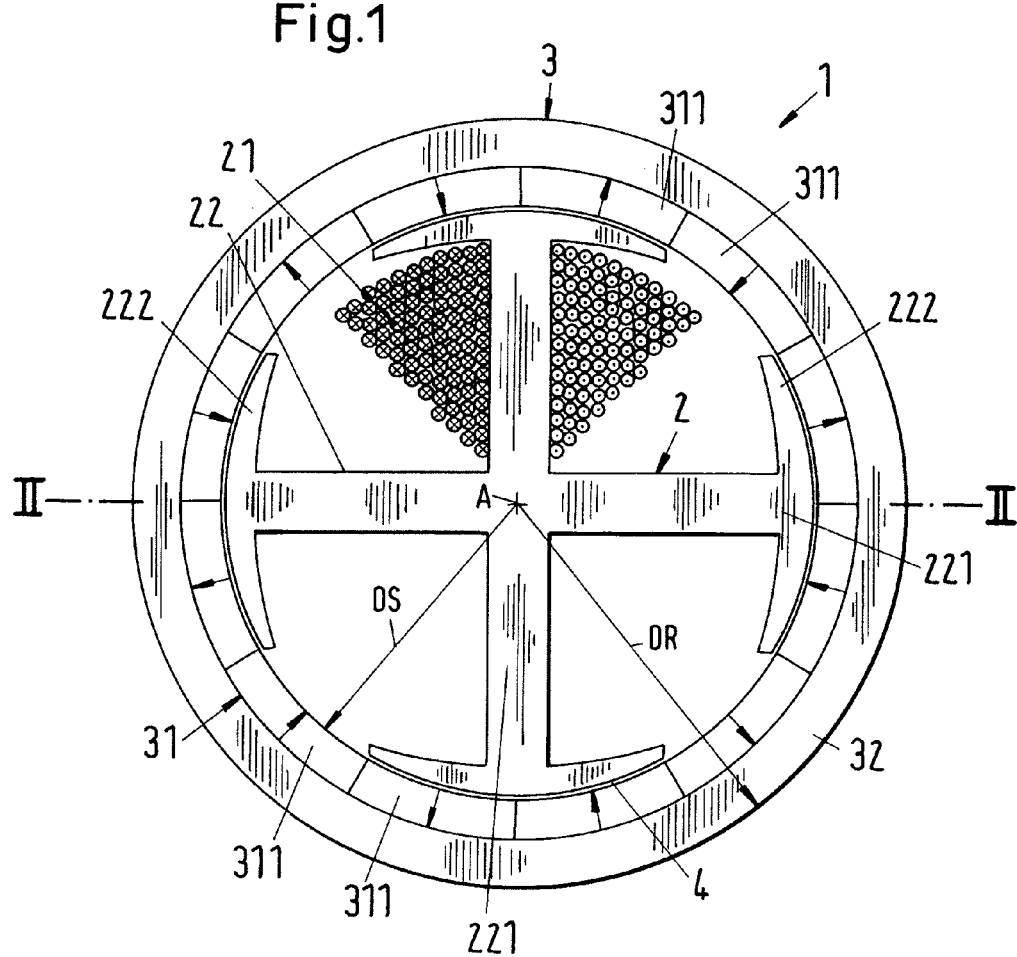

All the statements and explanations as were made for the embodiment shown in FIG. 1 apply in analogously the same manner to the second embodiment with respect to the magnetic height of the stator 2 and to the magnetic constructional height of the rotor 1. In particular all the variants shown in FIGS. 2-10 are also possible for the second embodiment (FIG. 11).

With the external rotor motor in accordance with the invention, substantially larger magnetic rotor heights H2 of the rotor 3 can also be stabilized magnetically passively against tilting for a preset radius of the air gap 4 between the rotor 3 and the stator 2 as with known bearingless external rotor motors having the same radius of the air gap. The maximum achievable tilt-stabilizing torque is also considerably higher with the rotary drive in accordance with the invention.

The magnetic rotor height H2 or the minimal magnetic rotor height is preferably at most as large as half the external diameter of the rotor 3, in particular at most as large as the radius of the air gap 4 between the stator 2 and the rotor 3.

The invention claimed is:

1. An electric rotary drive, designed as a bearingless external rotor motor, having a magnetically supported, substantially ring-shaped rotor which is arranged around an inwardly disposed stator, wherein an air gap is provided between the rotor and the stator, wherein the stator is designed as a bearing and drive stator with which the rotation of the rotor can be driven about an axis of rotation and with which the rotor can be magnetically supported, wherein the rotor is radially supported in an actively magnetic manner in the plane perpendicular to the axis of rotation and is supported axially in the direction of the axis of rotation and against tilting in a passively magnetic manner, characterized in that the stator has, at least in its marginal region, a magnetic height which is smaller than the magnetic rotor height of the rotor in its radially inwardly disposed region.

2. A bearingless motor, comprising:
a stator;
a substantially ring-shaped rotor which is disposed around the stator and is magnetically supported by the stator;
wherein an air gap is defined between the rotor and the stator;
wherein the stator comprises an outer region adjacent the air gap;
wherein the rotor comprises an inner region adjacent the air gap;
wherein a magnetic height of the outer region of the stator is smaller than a magnetic height of the inner region of the rotor;
wherein the stator is a bearing and drive stator configured to drive rotation of the rotor about an axis of rotation and with which the rotor is magnetically supported;
wherein, in a radial plane perpendicular to the axis of rotation, the rotor is firstly magnetically supported by the stator, wherein the first support is active, such that a position of the rotor in the radial plane is controllable;
wherein, in a direction along the axis of rotation, and in tilting directions of the rotor in which the rotor tilts with respect to the radial plane, the rotor is secondly magnetically supported by the stator, wherein the second support is passive, such that a position of the rotor in the direction along the axis of rotation and an orientation of the rotor in the tilting directions are not controllable.

3. The motor of claim 2, wherein a minimal magnetic rotor height is at most as large as half an external diameter of the rotor.

4. The motor of claim 2, wherein the stator defines a step in a magnetic height of the stator so that the magnetic height of the outer region of the stator is smaller than a magnetic height of a central region of the stator.

5. The motor of claim 2, wherein the magnetic height of the outer region of the stator decreases continuously in a radially outward direction along the outer region.

6. The motor of claim 2, wherein the magnetic height of the outer region of the stator decreases linearly in a radially outward direction along the outer region.

7. The motor of claim 2, wherein the magnetic height of the outer region of the stator decreases in a curved manner in a radially outward direction along the outer region.

8. The motor of claim 7, wherein a magnetically active portion of the stator is rounded along the outer region thereby providing the decrease in the magnetic height in the radially outward direction.

9. The motor of claim 2, wherein a magnetically active portion of the stator defines at least one peripheral groove at the outer region, wherein the peripheral groove extends around an entirety of the stator in a peripheral direction.

10. The motor of claim 2, wherein a magnetic height of the stator is constant over a diameter of a magnetically active portion the stator, wherein the magnetic height of the stator is the magnetic height of the outer region of the stator.

11. The motor of claim 2, wherein the rotor defines a step in a magnetic height of the rotor so that the magnetic height of the inner region of the rotor is larger than a magnetic height of an outer region of the rotor.

12. The motor of claim 2, wherein the magnetic height of the inner region of the rotor increases in a radially inward direction along the inner region.

13. The motor of claim 2, wherein the magnetic height of the inner region of the rotor increases continuously in a radially inward direction along the inner region.

14. The motor of claim 2, wherein the rotor comprises a substantially ring-shaped magnetically active portion, and wherein a magnetic height of the rotor is constant from a radially inward edge to a radially outward edge of the magnetically active portion of the rotor, wherein the magnetic height of the rotor is the magnetic height of the inner region of the rotor.

15. The motor of claim 2, wherein the stator comprises a plurality of stator teeth.

16. The motor of claim 2, wherein the rotor is a permanent magnetic rotor.

17. The motor of claim 15, wherein the stator comprises exactly four stator teeth.

* * * * *